US005349299A

United States Patent [19]

Kanehiro et al.

[11] Patent Number: 5,349,299

[45] Date of Patent: Sep. 20, 1994

[54] FUEL SUPPLY MISFIRE-DETECTING SYSTEM FOR INTERNAL COMBUSTION ENGINES

[75] Inventors: Masaki Kanehiro; Yuichi Shimasaki; Takuji Ishioka; Shigeki Baba; Takashi Hisaki; Shigeru Maruyama; Masataka Chikamatsu; Shukoh Terata; Kenichi Maeda; Kazuhito Kakimoto, all of Wako, Japan

[73] Assignee: Honda Giken Kogyo Kabushiki Kaishi, Tokyo, Japan

[21] Appl. No.: 989,438

[22] Filed: Dec. 11, 1992

[30] Foreign Application Priority Data

Dec. 13, 1991 [JP] Japan .................................. 3-352021

[51] Int. Cl.[5] ...................... F02P 17/00; F02M 65/00; G01M 15/00

[52] U.S. Cl. .................................. 324/399; 73/117.3; 123/479; 324/380; 324/391; 324/393

[58] Field of Search ............... 324/378, 380, 382, 388, 324/391, 392, 393, 395, 402; 73/116, 117.2, 117.3; 123/478–481; 364/431.03

[56] References Cited

U.S. PATENT DOCUMENTS

| | | | |
|---|---|---|---|
| 4,349,782 | 9/1982 | Doss . | |
| 4,401,948 | 8/1983 | Miura et al. | 324/388 |
| 4,547,734 | 10/1985 | Spaude | 324/399 X |
| 4,987,771 | 1/1991 | Iwata . | |
| 5,215,067 | 6/1993 | Shimasaki et al. | 324/399 X |
| 5,237,279 | 8/1993 | Shimasaki et al. | 324/399 X |

FOREIGN PATENT DOCUMENTS

| | | |
|---|---|---|
| 0056841 | 8/1982 | European Pat. Off. . |
| 4-279768 | 10/1992 | Japan . |
| 1464477 | 2/1977 | United Kingdom . |

*Primary Examiner*—Gerard R. Strecker
*Attorney, Agent, or Firm*—Nikaido, Marmelstein, Murray & Oram

[57] ABSTRACT

A misfire-detecting system detects a misfire occurring in an internal combustion engine. A value of sparking voltage for discharging a spark plug of the engine is detected. A differentiating circuit differentiates the detected value of the sparking voltage. A misfire-determining circuit compares the differential value of the sparking voltage with a predetermined value, and determines, based upon a result of the comparison, whether a misfire has occurred in the engine.

5 Claims, 10 Drawing Sheets

FUEL SUPPLY MISFIRE-DETECTING SYSTEM FOR INTERNAL COMBUSTION ENGINES

BACKGROUND OF THE INVENTION

1. Field of the Invention

This invention relates to a misfire-detecting system for internal combustion engines, and more particularly to a misfire-detecting system of this kind, which is adapted to detect a misfire attributable to the fuel supply system.

2. Prior Art

An internal combustion engine has spark plugs provided for cylinders for igniting a mixture of fuel and air drawn into the respective cylinders. In general, high voltage (sparking voltage) generated by the ignition coil of the engine is sequentially distributed to the spark plugs of the cylinders of the engine via a distributor, to ignite the air-fuel mixture. If normal ignition does not take place at one or more of the spark plugs, i.e. a misfire occurs, it will result in various inconveniences such as degraded drivability and increased fuel consumption. Furthermore, it can also result in so-called after-burning of unburnt fuel gas in the exhaust system of the engine, causing an increase in the temperature of a catalyst of an exhaust gas-purifying device arranged in the exhaust system. Therefore, it is essential to prevent occurrence of a misfire. Misfires are largely classified into ones attributable to the fuel supply system and ones attributable to the ignition system. Misfires attributable to the fuel supply system are caused by the supply of a lean mixture or a rich mixture to the engine, while misfires attributable to the ignition system are caused by failure to spark (so-called mis-sparking), i.e. normal spark discharge does not take place at the spark plug, due to smoking or wetting of the spark plug with fuel, particularly adhesion of carbon in the fuel to the spark plug, which causes current leakage between the electrodes of the spark plug, or abnormality in the ignition system.

The present assignee has already proposed a misfire-detecting system for detecting misfires attributable to the fuel supply system, which comprises sparking voltage detecting means, and misfire-determining means which determines occurrence of a misfire based on results of comparison between the detected value of the sparking voltage and a predetermined reference value (Japanese Provisinal Patent Publication (Kokai) No. 4-279768), and further a misfire-determining system of this kind which comprises sparking voltage-detecting means, and misfire-determining means which determines that a misfire has occurred when a time period over which the detected value of the sparking voltage exceeds a predetermined voltage value or a value proportional to an area of a portion of the detected sparking voltage exceeding the predetermined voltage value exceeds a reference value (corresponding U.S. Pat. No. 5215,067 issued Jun. 1, 1993 based on Japanese Patent Application No. 3-67940).

In the above proposed system, the time period over which the detected value of sparking voltage exceeds the predetermined voltage value corresponds to a time period over which a predetermined amount of electric charge or more is stored in a floating capacitance in the vicinity of the spark plug. However, depending upon the behavior of discharge caused by sparking of the spark plug, the charge can be discharged within a short time period even if a misfire has occurred. This phenomenon can take place when the sparking voltage assumes a considerably high voltage value due to occurrence of a misfire. In such an event, discharge again takes place between the electrodes of the spark plug and terminates within a short time period so that the misfire is not determined to have occurred.

SUMMARY OF THE INVENTION

It is an object of the invention to provide a misfire-detecting system for an internal combustion engine, which is capable of accurately detecting a misfire attributable to the fuel supply system even when the sparking voltage assumes a considerably high voltage value due to occurrence of a misfire.

It is a further object of the invention to provide a misfire-detecting system which is capable of accurately determining occurrence of a misfire in a manner being less affected by noise.

To attain the first-mentioned object, the present invention provides a misfire-detecting system for detecting a misfire occurring in an internal combustion engine having an ignition system including at least one spark plug, engine operating condition-detecting device for detecting values of operating parameters of the engine, signal-generating device for determining ignition timing of the engine, based upon values of operating parameters of the engine detected by the engine operating condition-detecting device and generating an ignition command signal indicative of the determined ignition timing, and sparking voltage-generating device responsive to the ignition command signal for generating sparking voltage for discharging the at least one spark plug, and voltage value-detecting device for detecting a value of the sparking voltage generated by the sparking voltage-generating device after generation of the ignition command signal, The misfire-detecting system according to the invention is characterized by an improvement comprising:

differentiating device for differentiating a value of the sparking voltage detected by the voltage-detecting device; and misfire-determining device for comparing a differential value of the sparking voltage obtained by the differentiating device with a predetermined value, and determining, based upon a result of the comparison, whether a misfire has occurred in the engine.

Preferably, to attain the second-mentioned object, the misfire-detecting system according to the invention includes time period-limiting device for setting a comparison period of time over which the comparison of the differential value of the sparking voltage with the predetermined value is to be made, and wherein the misfire-determining device compares the differential value of the sparking voltage with the predetermined value to determine occurrence of a misfire solely during the comparison period of time set by the time period-setting device.

More preferably, the misfire-detecting system according to the invention may include a delay device for delaying a value of the sparking voltage detected by the voltage-detecting device, by a predetermined period of time, and wherein the misfire-determining device compares a value of the sparking voltage delayed by the delay device and differentiated by the differentiating device with the predetermined value.

The misfire-detecting system according to the invention may further include second misfire-determining device which measures a period of time over which a value of the sparking voltage detected by the voltage-detecting device exceeds a predetermined value, and determines that a misfire has occurred, when the measured period of time exceeds a predetermined value, and/or third misfire-determining device for comparing a value of the sparking voltage detected by the voltage value-detecting device with a predetermined value after a predetermined period of time has elapsed after generation of the ignition command signal, and determining, based upon a result of the last-mentioned comparison, whether a misfire has occurred in the engine.

The above and other objects, features, and advantages of the invention will become more apparent from the following detailed description taken in conjunction with the accompanying drawings.

BRIEF DESCRIPTION OF THE DRAWINGS

FIG. 5 charts (*a*) to (*f*) form together a timing chart showing changes in the sparking voltage occurring at normal firing and those occurring at a misfire, in which:

Figure 3:
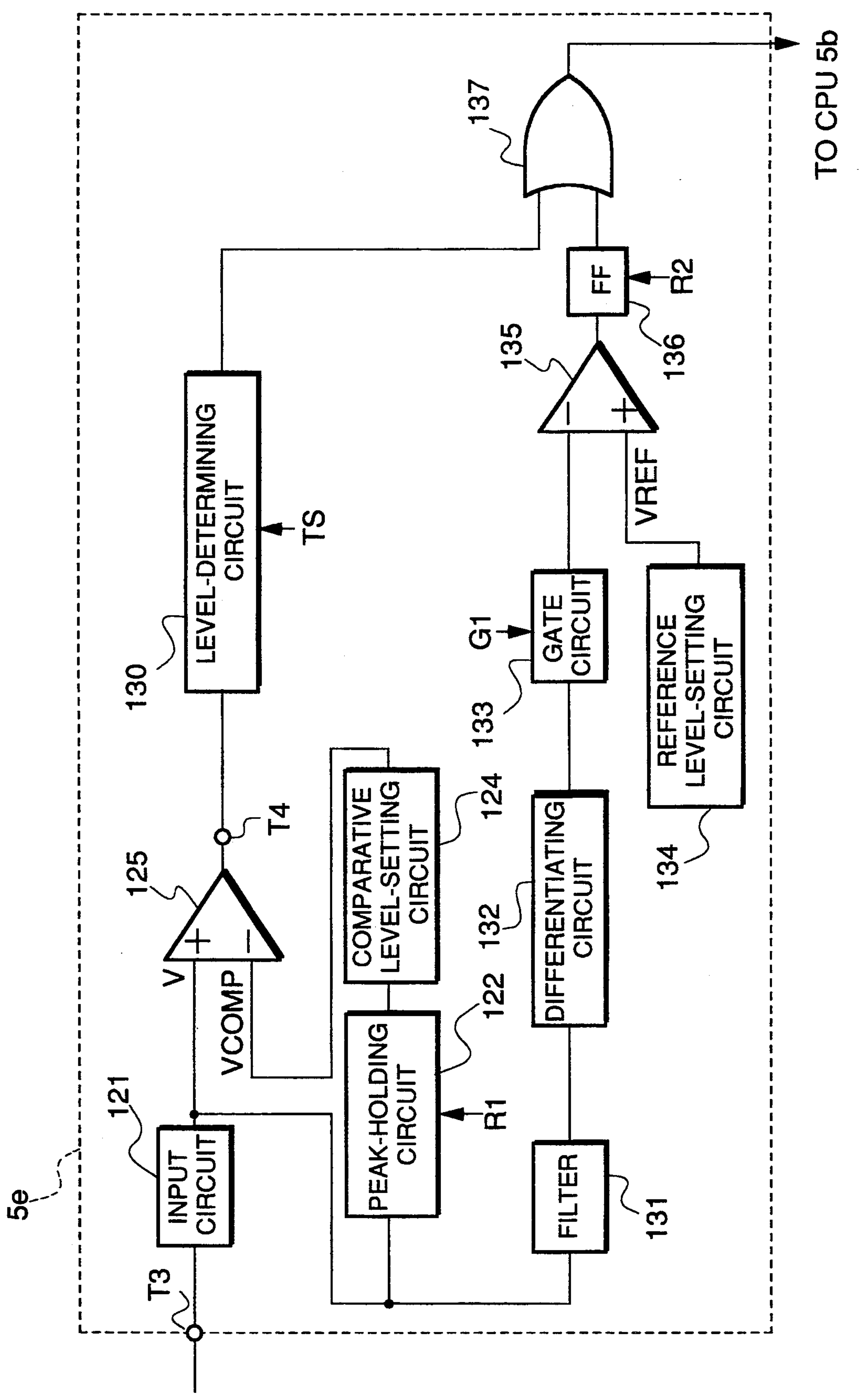
FIG. 3 is a circuit diagram showing details of a misfire-determining circuit appearing in FIG. 2.
Figures 5A, 5B, 5C, 5D, 5E, 5F:
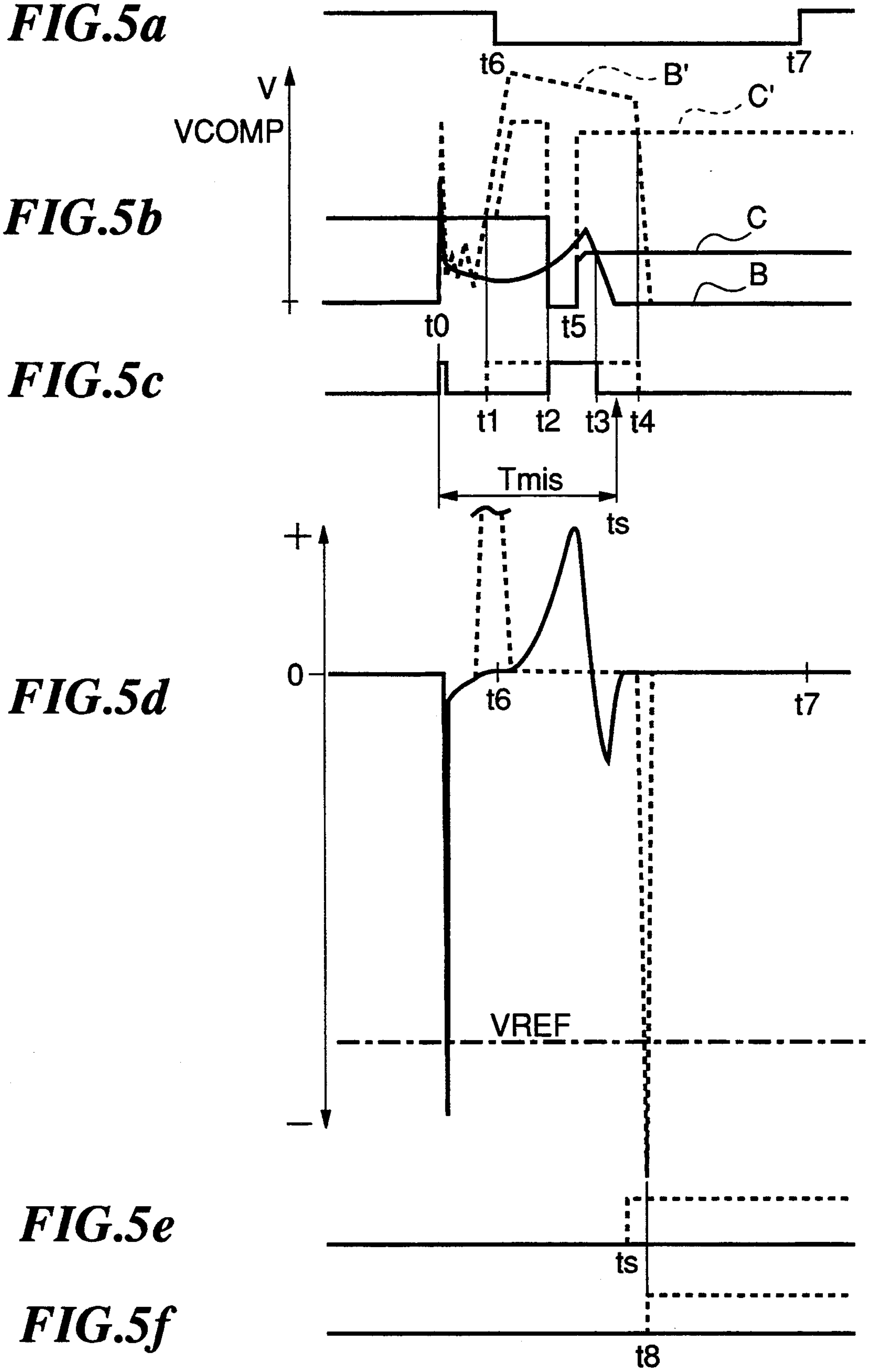
Figure 6:
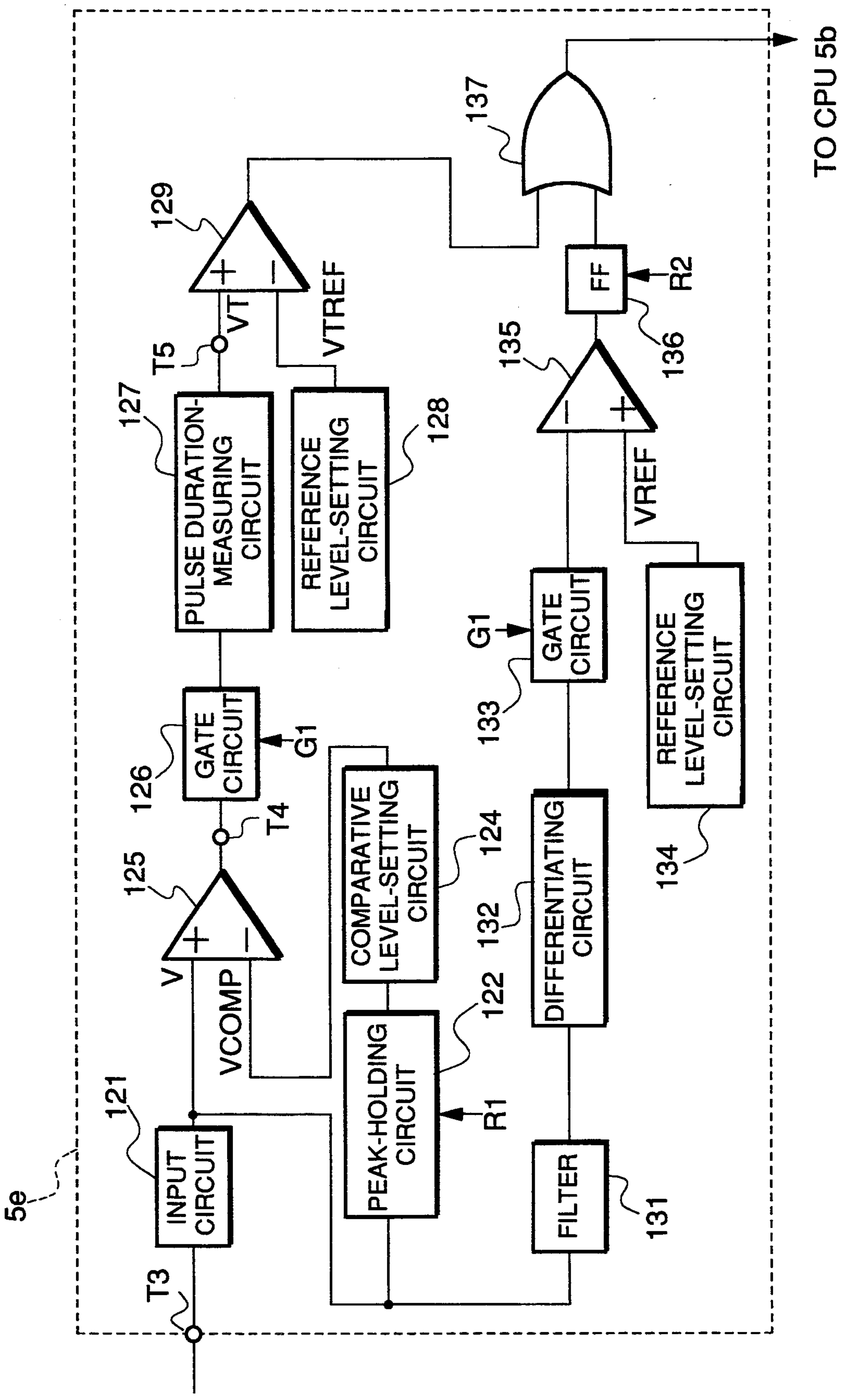
Figure 7:
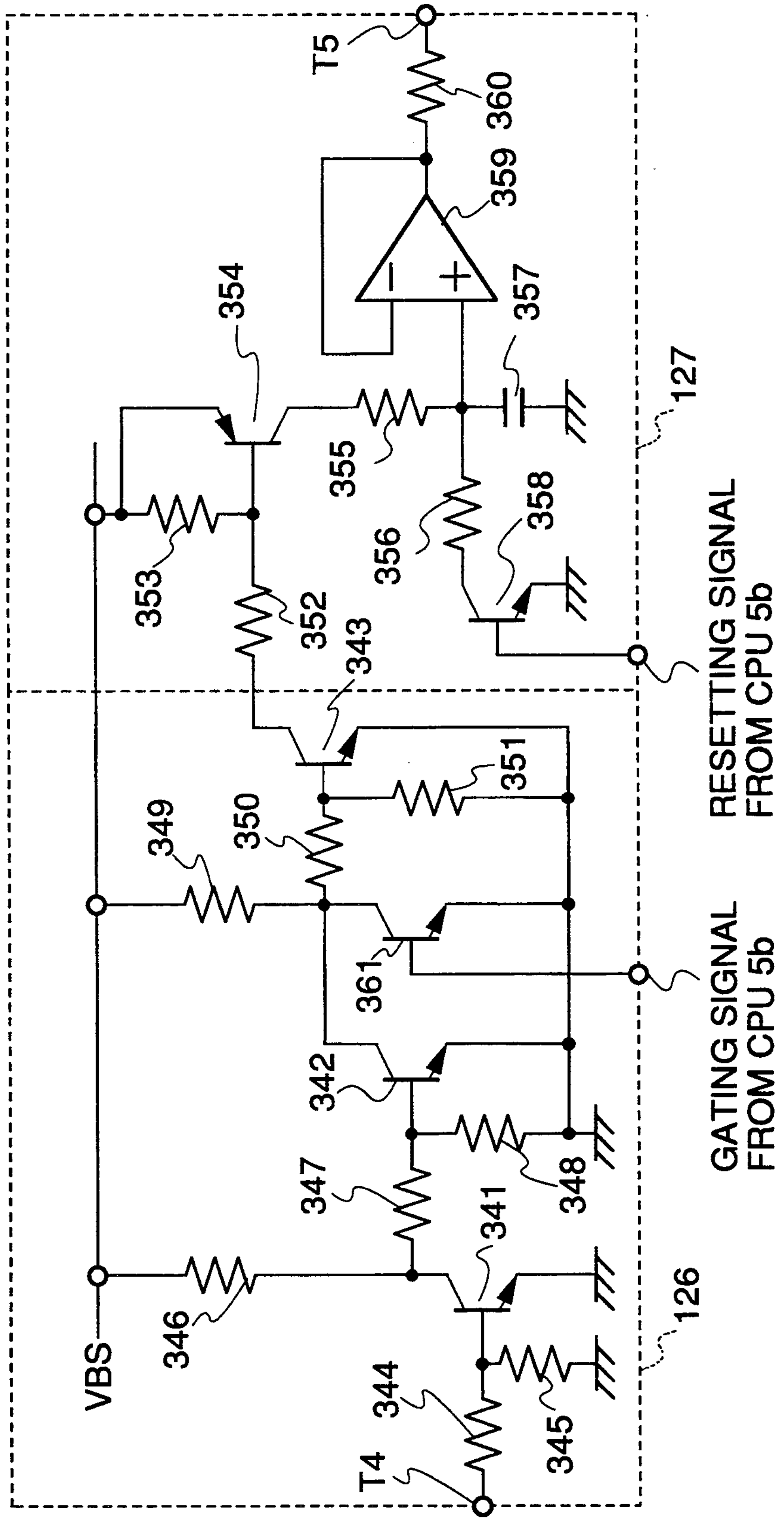
Figures 8A, 8B, 8C, 8D, 8E:
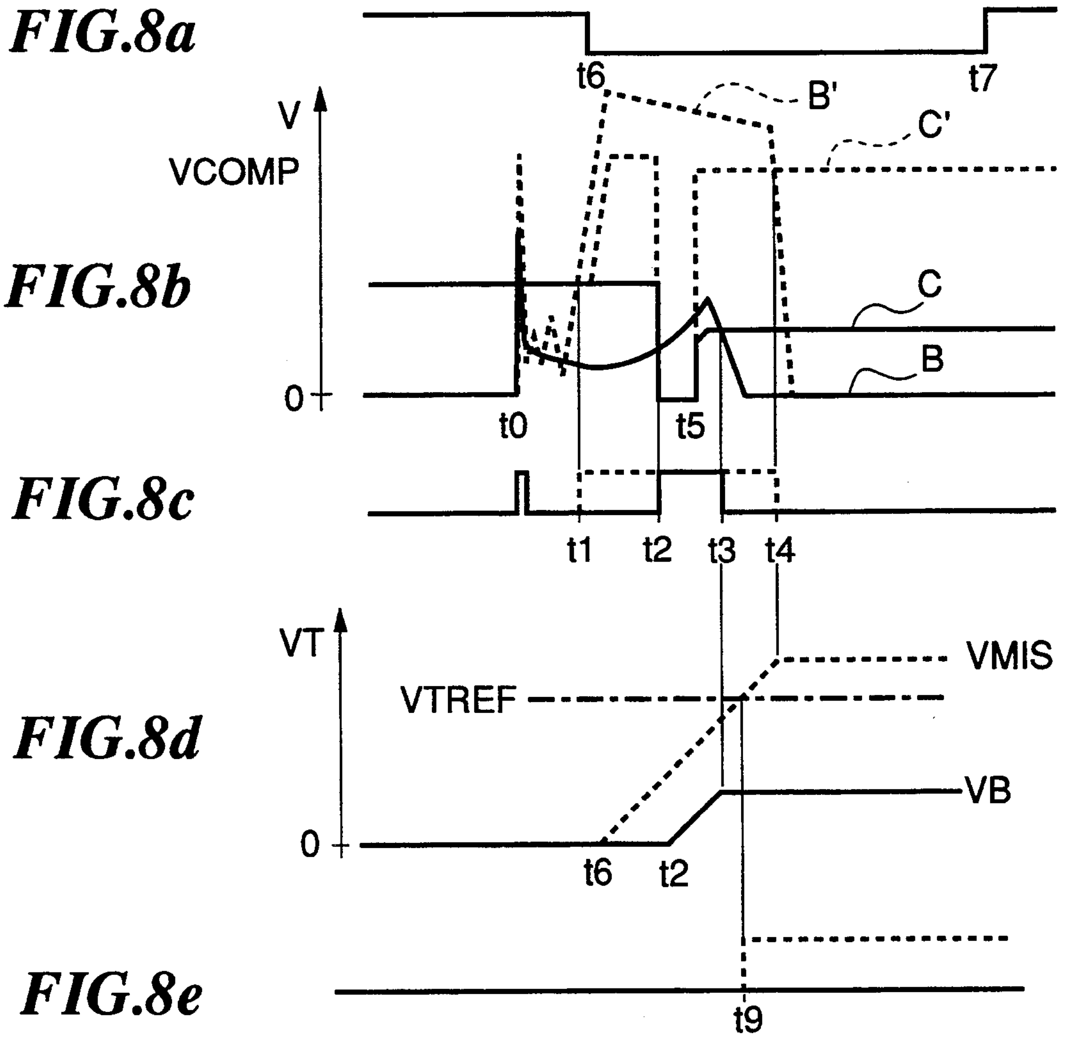
Figure 9:
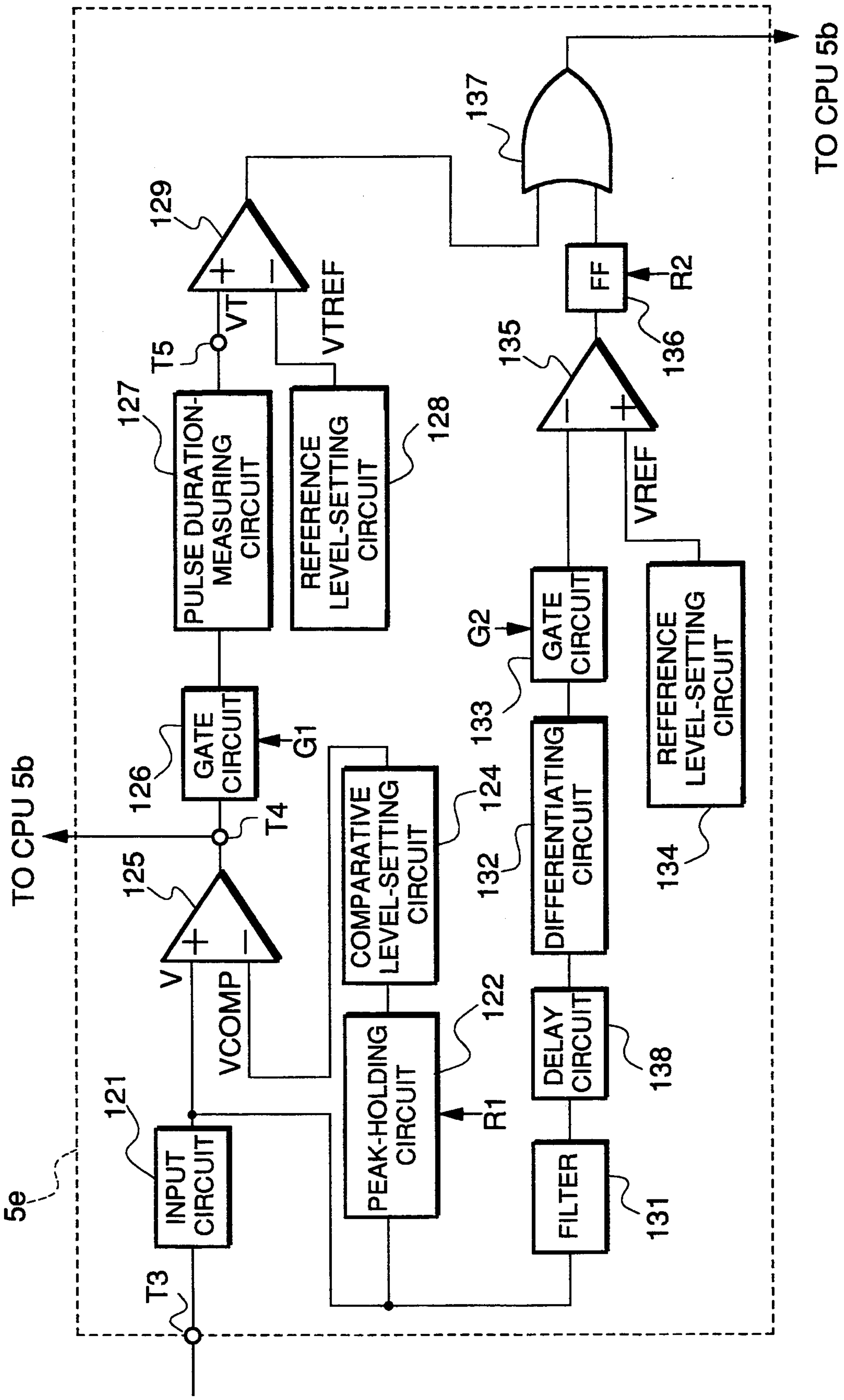
Figures 10A, 10B, 10C, 10D, 10E, 10F, 10G:
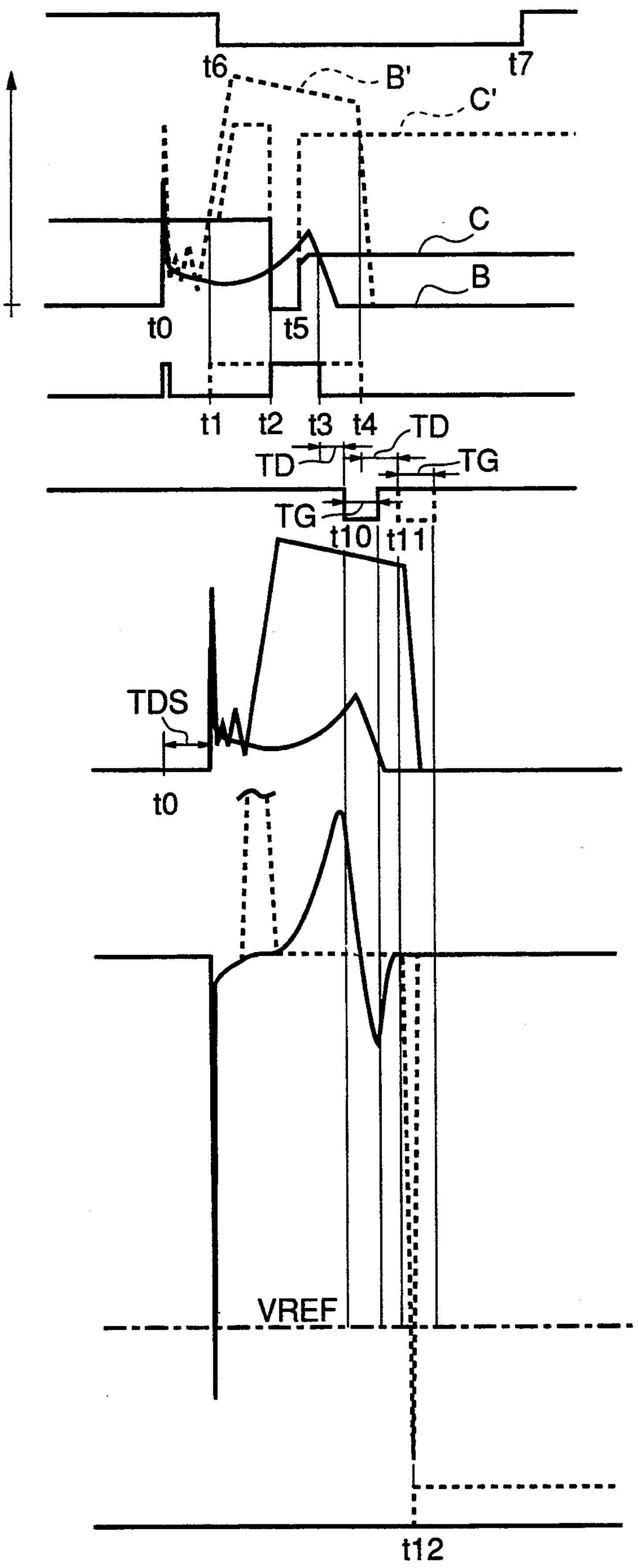

(*a*) shows a gating signal supplied to a gate circuit in FIG. 3;

(*b*) shows changes in a comparative level VCOMP to be compared with sparking voltage V;

(*c*) shows an output from a first comparator in FIG. 3;

(*d*) shows an output from a differentiating circuit in FIG. 3;

(*e*) shows an output from a level-determining circuit in FIG. 3; and (*f*) shows an output from a flip-flop circuit in FIG. 3;

FIG. 6 is a circuit diagram showing details of a misfire-determining circuit employed in a misfire-detecting system according to a second embodiment of the invention;

FIG. 7 is a circuit diagram showing details of essential parts of the circuit in FIG. 6;

FIG. 8 charts (*a*) to (*e*) form together a timing chart similar to FIG. 5 (*a*) to (*e*), in which:

(*a*) shows a gating signal;

(*b*) shows changes in a comparative level VCOMP to be compared with sparking voltage V;

(*c*) shows an output from a first comparator in FIG. 6;

(*d*) shows an output voltage VT from a pulse duration-measuring circuit in FIG. 6; and (*e*) shows an output from a third comparator in FIG. 6;

FIG. 9 is a circuit diagram showing details of a misfire-determining circuit employed in a misfire-detecting system according to a third embodiment of the invention; and FIG. 10 charts (*a*) to (*g*) form together a timing chart similar to FIG. 5 (*a*) to (*e*), in which:

(*a*) shows a gating signal G1 supplied to a gate circuit 126 in FIG. 9;

(*b*) shows changes in a comparative level VCOMP to be compared with sparking voltage;

(*c*) shows an output from a first comparator in FIG. 9;

(*d*) shows another gating signal supplied to a gate circuit 133 in FIG. 9;

(*e*) shows an output from a delay circuit in FIG. 9;

(*f*) shows an output from a differentiating circuit in FIG. 9; and (*g*) shows an output from a flip-flop circuit in FIG. 9.

DETAILED DESCRIPTION

The invention will now be described in detail with reference to the drawings showing embodiments thereof.

Figure 1:
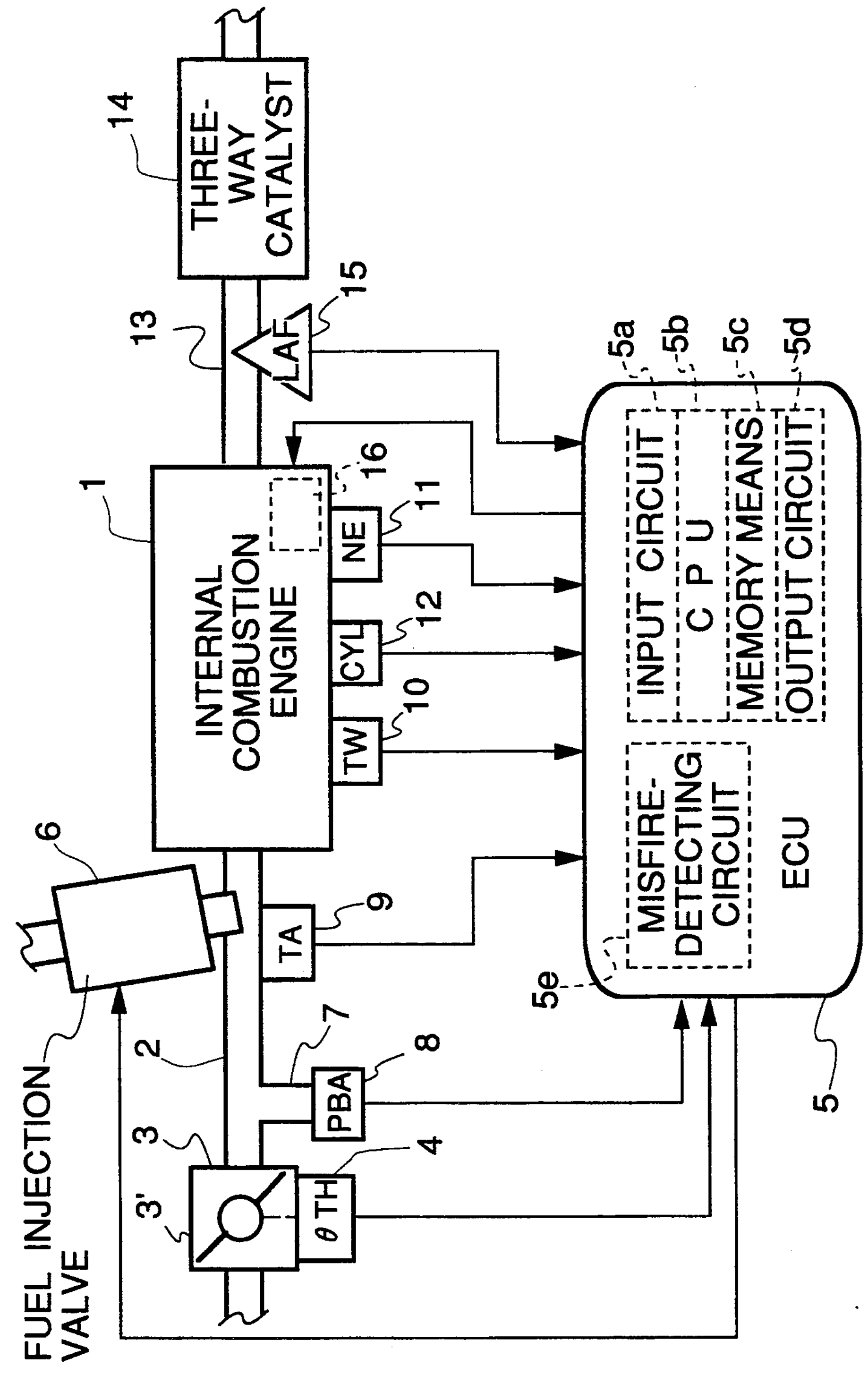
FIG. 1 is a block diagram showing the whole arrangement of an internal combustion engine and a misfire-detecting system therefor, according to a first embodiment of the invention.

Referring first to FIG. 1, there is shown the whole arrangement of an internal combustion engine of a four cylinder type, for example, which is provided with a control system therefor including a misfire-detecting system according to a first embodiment of the invention. In an intake pipe 2 of the engine 1, there is arranged a throttle body 3 accommodating a throttle valve 3'. A throttle valve opening ($\theta$th) sensor 4 is connected to the throttle valve 3' for generating an electric signal indicative of the sensed throttle valve opening and supplying the same to an electronic control unit (hereinafter referred to as "the ECU ") 5.

Fuel injection valves 6 are each provided for each cylinder and arranged in the intake pipe 2 at a location intermediate between the engine 1 and the throttle valve 3'and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure PBA to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the coolant-filled cylinder block of the engine 1 for supplying an electric signal indicative of the sensed engine coolant temperature TW to the ECU 5. An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and NOx. An oxygen concentration sensor (hereinafter referred to as the "LAF sensor ") 15 as an exhaust gas ingredient concentration sensor is mounted in the exhaust pipe 13 at a location upstream of the three-way catalyst 14, for supplying an electric signal having a level approximately proportional to the oxygen concentration in the exhaust gases to the ECU 5.

Further, the engine 1 is provided therein with an ignition device 16 comprised of an ignition coil, spark plugs, hereinafter referred to, which has its operation controlled by an ignition command signal A from the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU ") 5b, memory means 5c storing various operational programs which are executed by the CPU 5b and for storing results of calculations therefrom, etc., and an output circuit (driving circuit) 5d which outputs a driving signal to the fuel injection valves 6, and the ignition command signal A to the ignition device 16.

The CPU 5b operates in response to the aforementioned signals from the sensors to determine operating conditions in which the engine 1 is operating, such as an air-fuel ratio feedback control region in which the air-fuel ratio is controlled to a stoichiometric value in response to an output from the LAF sensor 15 and air-fuel ratio open-loop control regions, and calculates, based upon the determined engine operating conditions, the valve opening period or fuel injection period Tout over which the fuel injection valves 6 are to be opened, in synchronism with inputting of TDC signal pulses to the ECU 5. The CPU 5b also calculates ignition timing TIG of the engine in response to operating parameter signals from operating parameter sensors such as the PBA sensor 8 and the NE sensor 11. Further, the CPU 5b calculates the ignition timing TIG of the engine, based upon the determined engine operating conditions.

The CPU 5b further carries out detection of a misfire occurring in the engine, as hereinafter described.

The CPU 5b supplies the fuel injection valves 6 and the ignition device 16, respectively, with driving signals based on the results of calculations carried out as above, through the output circuit 5d.

Figure 2:
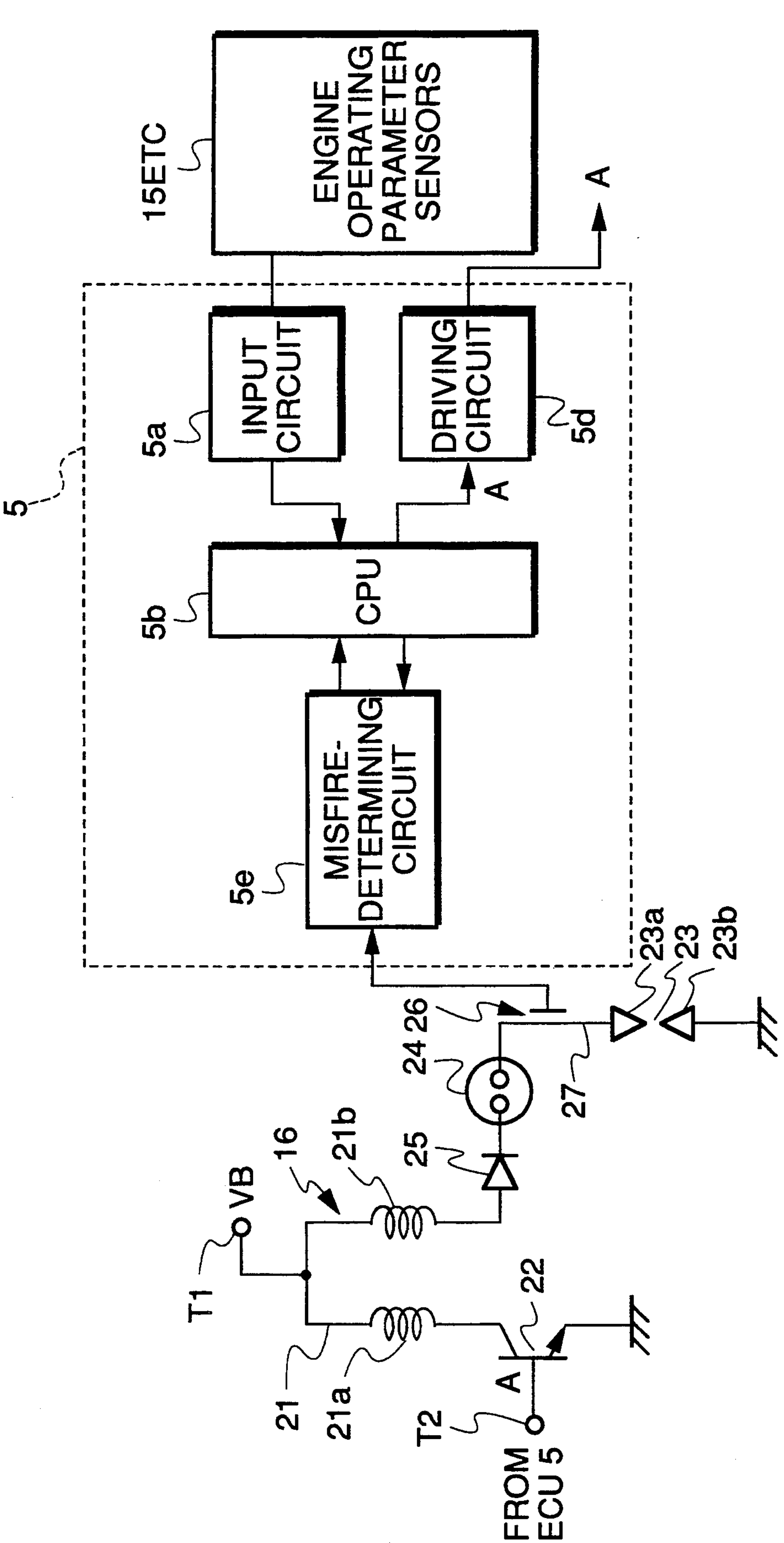
FIG. 2 is a schematic circuit diagram showing the circuit arrangement of the misfiring-detecting system according to the first embodiment.

FIG. 2 shows the circuit arrangement of a misfire-detecting system according to the present embodiment. A feeding terminal T1, which is supplied with supply voltage VB for the ignition device 16, is connected to an ignition coil 21 comprised of a primary coil 21a and a secondary coil 21b. The primary and secondary coils 21a, 21b are connected with each other at one ends thereof. The other end of the primary coil 21a is connected to a collector of a transistor 22. The transistor 22 has its base connected via the driving circuit 5d to the CPU 5b and its emitter grounded. The base of the transistor 22 is supplied with the ignition command signal A from the CPU 5b. The other end of the secondary coil 22b is connected to a diode 25 and via a distributor 24 to a center electrode 23a of each spark plug 23. The spark plug 23 has its grounding electrode 23b grounded.

A sparking voltage sensor 26 is provided at an intermediate portion of a connecting line 27 which connects between the distributor 24 and the center electrode 23a of the spark plug 23. The sensor 26 is electrostatically coupled to the connecting line 27 and forms together therewith a capacitance of several pF's, and its output is connected to a misfire-determining circuit 5e of the ECU 5. The misfire-determining circuit 5e is connected to the CPU 5b to supply results of its determination of a misfire thereto. The CPU 5b carries out timing control related to the misfire determination.

FIG. 3 shows details of the misfire-determining circuit 5e. An input terminal T3 thereof is connected via an input circuit 121 to a non-inverting input terminal of a first comparator 125, as well as to a peak-holding circuit 122, and a filter 131. An output of the peak-holding circuit 122 is connected via a comparative level-setting circuit 124 to an inverting input terminal of the first comparator 125. The peak-holding circuit 122 is supplied with a resetting signal R1 from the CPU 5b for resetting at an appropriate time a peak value of the sparking voltage held by the peak-holding circuit 122.

An output from the first comparator circuit 125 is supplied to a terminal T4 and a level-determining circuit 130, which in turn has its output connected to one input terminal of an OR circuit 137. The level-determining circuit 130 is supplied with a determination timing signal TS from the CPU 5b and outputs a high level signal when an output from the first comparator 125 (a comparison result pulse) is at a high level; and a low level signal when the latter is at a low level.

The filter 131 has its output connected to an inverting input terminal of a second comparator 135 via a differentiating circuit 132 and a gate circuit 133. The filter 131 is a low-pass filter for eliminating undesired high-frequency noise components from the detected sparking voltage signal, which has its cut-off frequency set at a value considerably higher than the cut-off frequency of the differentiating circuit 132. The gate circuit 133 is supplied with a gating signal G1 from the CPU 5b.

A reference level-setting circuit 134 is connected to a non-inverting input terminal of the second comparator 135 to supply same with a predetermined reference voltage VREF. An output of the second comparator 135 is connected to a flip-flop circuit 136, an output of which is connected to the other input terminal of the OR circuit 137. The flip-flop circuit 136 is supplied with a resetting signal R2 from the CPU 5b. An output from the flip-flop circuit 136 assumes a low level when reset by the resetting signal R2, and changes from the low level to a high level as the output from the second comparator 135 changes from a low level to a high level, and thereafter is held at the high level until the flip-flop circuit 136 is again reset.

Figure 4:
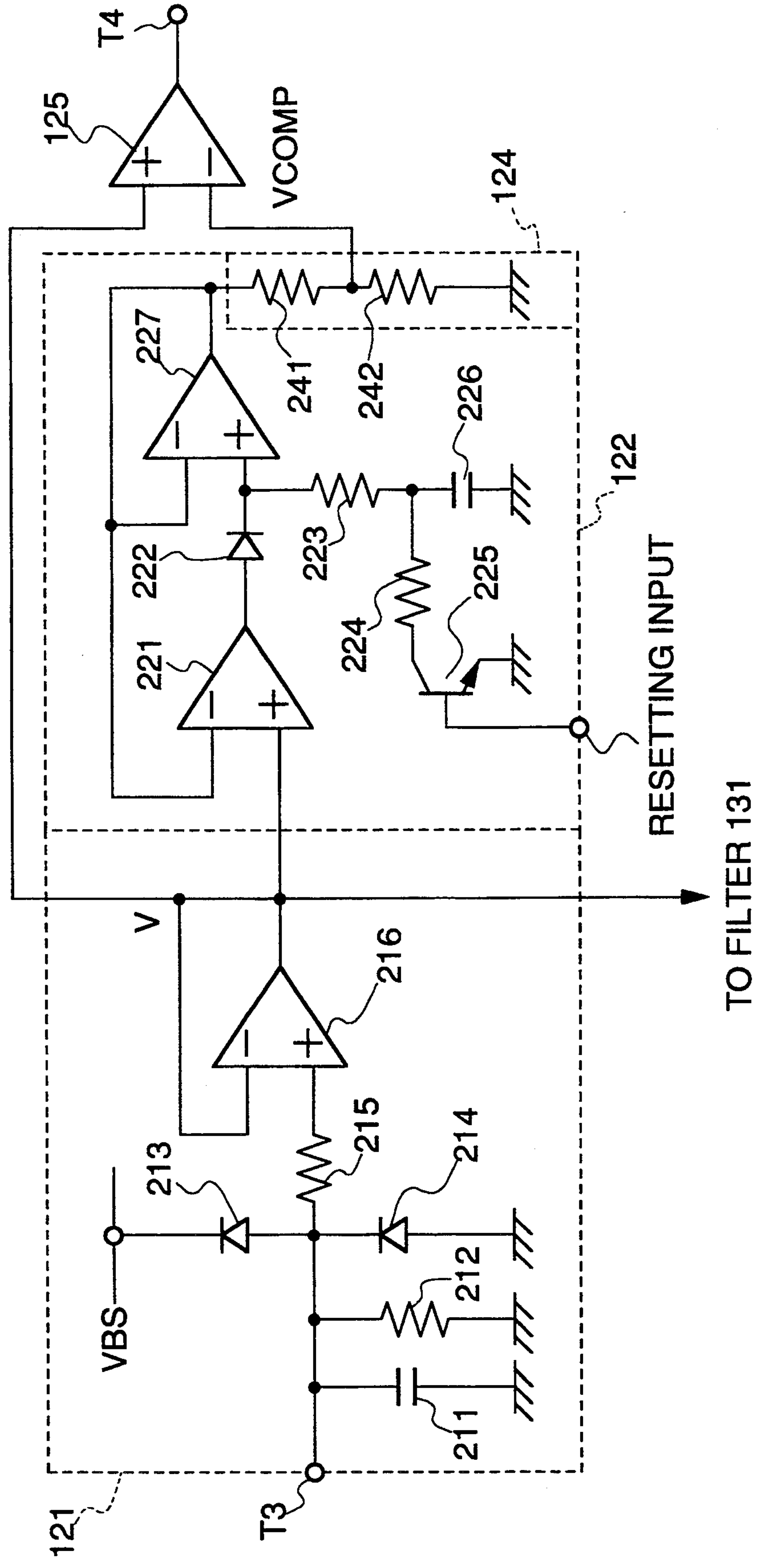
FIG. 4 is a circuit diagram showing details of essential parts of the misfire-determining circuit.

FIG. 4 shows details of the input circuit 121, the peak-holding circuit 122, and the comparative level-setting circuit 124, which appear in FIG. 3. In the figure, the input terminal T3 is connected to a non-inverting input terminal of an operational amplifier 216 via a resistance 215. The input terminal T3 is also grounded via a circuit formed of a capacitor 211, a resistance 212, and a diode 214, which are connected in parallel, and connected to a supply voltage-feeding line VBS via a diode 213.

The capacitor 211 has a capacitance of $10^4$pF, for example and serves to divide voltage detected by the sparking voltage sensor 26 into one over several thousands. The resistance 212 has a value of 500 KΩ, for example. The diodes 213 and 214 act to control the input voltage to the operational amplifier 216 to a range of 0 to VBS. An inverting input terminal of the operational amplifier 216 is connected to an output of the same so that the operational amplifier 216 operates as a buffer amplifier (impedance converter). The output of the operational amplifier 216 is connected to the non-inverting input terminal of the first comparator 125 as well as to a non-inverting input terminal of an operational amplifier 221 and the filter 131. An output of the operational amplifier 221 is connected via a diode 222 to a non-inverting input terminal of an operational amplifier 227, and inverting input terminals of the operational amplifiers 221, 227 are both connected to an output of the operational amplifier 227. Thus, these operational amplifiers operate as a buffer amplifier. A non-inverting input terminal of the operational amplifier 227 is grounded via a resistance 223 and a capacitance 226. The junction between the resistance 223 and the capacitance 226 is connected via a resistance 224 to a collector of a transistor 225. The transistor 225 has its emitter grounded and its base supplied with the resetting signal R1 from the CPU 5*b*, which signal assumes a high level when the peak-holding circuit 122 is to be reset. The output of the operational amplifier 227 is grounded via resistances 241 and 242 forming the comparative level-setting circuit 124, The junction between the resistances 241, 242 is connected to the inverting input terminal of the first comparator 125.

The circuit of FIG. 4 constructed as above operates as follows: A peak value of the detected sparking voltage (output from the operational amplifier 216) is held by the peak-holding circuit 122, the held peak value is multiplied by a predetermined value smaller than 1 by the comparative level-setting circuit 124, and the resulting product is applied to the first comparator 125 as a comparative level VCOMP. Thus, a comparison result pulse, which goes high when V>VCOMP, is output from the first comparator 125 through an output terminal T4.

The operation of the misfire-determining circuit 5*e* constructed as above will now be described with reference to FIG. 5 (*a*)–(*f*), showing changes in the sparking voltage (secondary voltage) with the lapse of time upon generation of the ignition command signal, wherein the solid line depicts changes in the sparking voltage, which occur when the air-fuel mixture is normally fired, and the broken line changes in the sparking voltage, which occur when misfire occurs, which is attributable to the fuel supply system (hereinafter referred to as "the FI misfire").

FIG. 5 (*b*) shows changes in the detected sparking voltage (output from the input circuit 121) V (B, B') and changes in the comparative level VCOMP (C, C') with the lapse of time. First, a sparking voltage characteristic obtainable in the case of normal firing will be explained, which is indicated by the solid line:

Immediately after a time point to the ignition command signal A is generated, the sparking voltage V rises to such a level as to cause dielectric breakdown of the mixture between the electrodes of the spark plug, i.e. across the discharging gap of the spark plug. After dielectric breakdown of the mixture takes place, the discharge state shifts from a capacitive discharge state before the dielectric breakdown (early-stage capacitive discharge), which state has a very short duration with several hundreds amperes of current flow, to an inductive discharge state which has a duration of several milliseconds and where the sparking voltage assumes almost a constant value with several tens milliamperes of current flow. The inductive discharge voltage rises with an increase in the pressure within the engine cylinder caused by the compression stroke of the piston executed after the time point t0, since a higher voltage is required for inductive discharge to occur as the cylinder pressure increases. At the final stage of the inductive discharge, the voltage between the electrodes of the spark plug lowers below a value required for the inductive discharge to continue, due to decreased inductive energy of the ignition coil so that the inductive discharge ceases and again capacitive discharge occurs. In this capacitive discharge state (late-stage capacitive discharge), the voltage between the spark plug electrodes again rises, i.e. in the direction of causing dielectric breakdown of the mixture. However, since the ignition coil 49 then has a small amount of residual energy, the amount of rise of the voltage is small. This is because the electrical resistance of the discharging gap is low due to ionizing of the mixture during firing.

Residual charge between the electrodes of the spark plug 23, which is left after the discharge, is stored in the floating capacitance between the diode 25 and the spark plug 23. The stored residual charge is not discharged toward the ignition coil 21 due to the presence of the diode 25, But, the stored charge is neutralized by ions present in the vicinity of the electrodes of the spark plug 23, so that the sparking voltage V promptly declines after the termination of the capacitive discharge.

Next, reference is made to a sparking voltage characteristic indicated by the broken line, which is obtained when a FI misfire occurs, i.e. no firing occurs, which is caused by the supply of a lean mixture to the engine or cutting-off of the fuel supply to the engine due to failure of the fuel supply system, etc. Immediately after the time point t0 of generation of the ignition command signal A, the sparking voltage rises above a level causing dielectric breakdown of the mixture. In this case, the ratio of air in the mixture is greater than when the mixture has an air-fuel ratio close to a stoichiometric ratio, and accordingly the dielectric strength of the mixture is high. Besides, since the mixture is not fired, it is not ionized so that the electrical resistance of the discharging gap of the plug is high. Consequently, the dielectric breakdown voltage becomes higher than that obtained in the case of normal firing of the mixture. Thereafter, the discharge state shifts to an inductive discharge state, as in the case of normal firing. Also, the electrical resistance of the discharging gap of the plug at the discharge of the ignition coil is greater in the case of supply of a lean mixture, etc. than that in the case of normal firing so that the inductive discharge voltage rises to a higher level than at normal firing, resulting in an earlier shifting from the inductive discharge state to a capacitive discharge state (late-stage capacitive discharge). The capacitive discharge voltage upon the transition from the inductive discharge state to the capacitive discharge state is much higher than that at normal firing, because the voltage of dielectric breakdown of the mixture is higher than that at normal firing.

On this occasion, almost no ion is present in the vicinity of the electrodes of the spark plug 23 so that the charge stored between the diode 25 and the spark plug 23 is not neutralized, nor is it allowed to flow backward to the ignition coil 21 due to the presence of the diode 25. Therefore, the charge is held as it is without being discharged through the electrodes of the spark plug 23. Then, when the pressure within the engine cylinder lowers so that the voltage between the electrodes of the spark plug 2 required for discharge to occur becomes equal to the voltage applied by the charge, there occurs a discharge between the electrodes (time point t4 in FIG. 4). Thus, even after the termination of the capacitive discharge, the sparking voltage V is maintained in a high voltage state over a longer time period than at normal firing.

The curves C, C'in FIG. 5 (*b*) show changes in the comparative level VCOMP with the lapse of time, obtained from the held peak value of the sparking voltage V. The peak-holding circuit 122 is reset during time points t2 and t5. FIG. 5 (*c*) shows outputs from the first comparator 125. As is clear from FIG. 5 (*b*) and FIG. 5 (*c*), at normal firing, V>VCOMP holds between time points t2 and t3, and during which the output from the first comparator 125 has a high level.

On the other hand, at misfire, V>VCOMP holds between time points t1 and t4. Therefore, it is possible to determine occurrence of a misfire by applying the determination timing signal TS from the CPU 5*b* to the level-determining circuit 130 in FIG. 3 upon the lapse of a predetermined period of time Tmis from the time point t0, and monitoring the output from the circuit 130. That is, when a misfire occurs, the circuit output goes high at a time point tS and is held at the high level thereafter, whereas when normal firing occurs, the circuit output is maintained at a low level, as shown in FIG. 5 (*e*).

FIG. 5 (*d*) shows changes in the output from the differentiating circuit 132. FIG. 5 (*a*) shows a gating signal G1 supplied to the gate circuit 133. The gate circuit 133 allows an input signal supplied thereto to pass therethrough only when the gating signal G1 assumes a low level so that the inverting input terminal of the second comparator 135 is supplied with the output from the differentiating circuit 132 only between a time point t6 and a time point t7. Therefore, by setting the reference voltage VREF which has a negative value, as shown in FIG. 5 (*d*), the flip-flop circuit 136 generates an output as shown in FIG. 5 (*f*). That is, at a misfire, the flip-flop circuit 136 generates a high level output at and after a time point t8, to thereby indicate occurrence of a misfire.

The outputs from the level-determining circuit 130 and the flip-flop circuit 136 are supplied to the CPU 5*b* via the OR circuit 137, and the CPU 5*b* determines that a misfire has occurred when at least one of the outputs from the circuits 130, 136 assumes a high level.

As described above, according to the present embodiment, misfire determination is made based upon the differential value of the sparking voltage V. Therefore, when the sparking voltage V rises to a very high voltage toward the end of discharge and dielectric breakdown takes place at an early time due to occurrence of a misfire, the change in the differential value of the sparking voltage V becomes very large as compared with that at normal firing, to thereby make it possible to positively detect the misfire.

Further, according to the present embodiment, another misfire determination is carried out at the same time as the misfire determination based upon the differential sparking voltage value, which is based upon the relationship between the sparking voltage V and the comparative level VCOMP upon the lapse of the predetermined period of time Tmist from the time point t0 of generation of the ignition command signal A. Therefore, even when the sparking voltage V does not rise to a very high voltage at a misfire, the misfire can be detected without fail, thereby enhancing the reliability of misfire detection.

FIG. 6 shows the arrangement of the misfire-determining circuit 5*e* according to a second embodiment of the invention. In this embodiment, the level-setting circuit 130 employed in the first embodiment of FIG. 3 is replaced by a gate circuit 126, a pulse duration-measuring circuit 127, a reference level-setting circuit 128, and a third comparator 129. Except for this, the circuit arrangement of this embodiment is identical with that of the first embodiment. In FIG. 6, elements and parts corresponding to those in FIG. 3 are designated by identical reference numerals.

In FIG. 6, an output from the first comparator 125 is supplied via the gate circuit 126 to the pulse duration-measuring circuit 127, which measures a time period over which the output from the first comparator 125 is at a high level within a gating time period during which the gate circuit 126 allows its input signal to pass therethrough, and applies a voltage VT having a value corresponding to the measured time period to terminal t5 and a non-inverting input terminal of the third comparator 129. Connected to a non-inverting input terminal of the third comparator 129 is the reference level-setting circuit 128 which applies a reference voltage VTREF for misfire determination. When VT>VTREF the third comparator 129 generates a high level output indicating occurrence of a misfire. The reference voltage VTREF is set based upon operating conditions of the engine.

FIG. 7 shows details of the gate circuit 126 and the pulse duration-measuring circuit 127. The gate circuit 126 is comprised of three serially-connected inverting circuits formed by transistors 341 to 343 and resistances 344 to 351. Further, a transistor 361 is connected between a collector of the transistor 342 and ground, and has its base supplied with the gating signal G1 from the CPU 5*b*. Accordingly, during a gating time period during which the gating signal G1 is at a low level, potential at a collector of the transistor 343 goes high and low as the voltage at the input terminal T4 goes high and low, whereas when the gating signal G1 is at a high level, the potential at the collector of the transistor 343 is at a high level irrespective of the voltage at the terminal T4. The collector of the transistor 343 is connected via a resistance 352 to a base of a transistor 354, the base being also connected via a resistance 353 to a power supply line VBS. The transistor 354 has its emitter directly connected to the power supply line VBS and its collector grounded via a resistance 355 and a capacitor 357. The junction of the resistance 355 with the capacitor 357 is connected via an operational amplifier 359 and a resistance 360 to an output terminal T5. The operational amplifier 359 operates as a buffer amplifier. The junction of the resistance 355 with the capacitor 357 is also connected via a resistance 356 to a collector of a transistor 358, which in turn has its emitter grounded, and its base supplied with a resetting signal from the CPU 5*b*.

The FIG. 7 circuit operates as follows: When the gating signal G1 is at a low level and the voltage at the input terminal T4 is at a high level, the collector of the transistor 343 goes low, to turn the transistor 354 on whereby the capacitor 357 is charged, whereas when the gating signal G1 is at a high level or the voltage at the terminal T4 is at a low level, the transistor 354 is turned off to stop charging of the capacitor 357. As a result, the output terminal T5 supplies the voltage VT which is proportional to the length of a time period over which the pulse signal supplied to the terminal T4 is at a high level during the gating time period.

The operation of the circuits 126–129 constructed as above will be described with reference to FIG. 8 (*a*) to FIG. 8 (*e*).

FIG. 8 (*a*) to FIG. 8 (*c*) are substantially identical with FIG. 5 (*a*) to FIG. 5 (*c*). The gating signal shown in FIG. 8 (*a*) is supplied to the gate circuits 126, 133.

When a misfire occurs, at a time point t6 when the gate circuit 126 is opened, V>VTREF so that the comparative result pulse (an output pulse from the first comparator 125) is high in level. Consequently, the output voltage VT from the pulse duration-measuring circuit 127 changes as indicated by the broken line in FIG. 8 (*d*) and rises to a level VMIS. On the other hand, at normal firing, the output voltage VT changes as indicated by the solid line in FIG. 8 (*d*) and rises to a level VB. Therefore, by setting the reference voltage VTREF so as to lie between the level VB and the level VMIS, the third comparator 129 generates an output as shown in FIG. 8 (*e*), that is, at a misfire, the output from the third comparator 129 goes high at a time point t9 and held at the high level thereafter, to thereby detect the misfire.

The second embodiment, as described above, utilizes the fact that the voltage value VT corresponding to the duration of the comparison result pulse largely differs between at a misfire and at normal firing to thereby enable more accurate detection of a misfire as compared with the first embodiment.

FIG. 9 shows the arrangement of the misfire-determining circuit 5*e* according to a third embodiment of the invention. In FIG. 9, elements and parts corresponding to those in FIG. 6 are designated by identical reference numerals. As shown in the figure, a delay circuit 138 is connected between the filter 131 and the differentiating circuit 132. The terminal T4 is connected to the CPU 5*b* to supply the comparison result pulse to the CPU 5*b*. The CPU 5*b* generates a gating signal G2 to be supplied to the gate circuit 133, in response to the comparison result pulse, as hereinafter described.

Except for those mentioned above, the FIG. 9 circuit is identical with the FIG. 6 circuit of the second embodiment.

The operation of the misfire-determining circuit of FIG. 9 will now be described with reference to FIG. 10 (*a*) to FIG. 10 (*g*). FIG. 10 (*a*) to FIG. 10 (*c*) are identical with FIG. 8 (*a*) to FIG. 8 (*c*). FIG. 10 (*e*) shows an output from the delay circuit 138, and FIG. 10 (*f*) an output from the differentiating circuit 132.

The gating signal G2 is applied to the gate circuit 133, which signal assumes a low level for a predetermined gating time period TG starting from a time point t10, t11 after the lapse of a predetermined period of time TD following a time point t3, t4 at which the comparison result pulse falls. Accordingly, only during the gating time period TG the inverting input terminal of the second comparator 135 is supplied with the output from the differentiating circuit 132, which output is compared with the reference voltage VREF. As a result, when a misfire occurs, at a time point t12 falling within the gating time period TG which starts at the time point t11, the output voltage from the differentiating circuit 132 falls below the reference voltage VREF. On the other hand, at normal firing, the output voltage from the differentiating circuit 132 never falls below the reference voltage VREF during the gating time period TG which starts at the time point t10. Thus, the output from the flip-flop circuit 136 goes high at the time point t12 only when a misfire occurs, to thereby detect the misfire.

In the arrangement of the third embodiment, by setting the predetermined period of time TD at a suitable value depending upon a delay time TS of the sparking voltage, i.e. the time period between generation of the ignition command signal A and rising of the delayed sparking voltage V due to the early-stage capacitive discharge, the misfire determination can be made based upon the differential value of the delayed sparking voltage assumed during the time period during which the differential value largely increases in the negative direction, which can reduce the influence of noise components in the sparking voltage upon the misfire determination, thereby further enhancing the accuracy of misfire determination.

The location of the delay circuit 138 is not limited to the one between the circuits 131 and 132, shown in FIG. 9, but the delay circuit 138 may be located at any other place insofar as it is between the output of the input circuit 121 and the inverting input terminal of the second comparator 135. Further, in place of the delay circuit, the filter 131 and the differentiating circuit 132 may be designed to have a suitable delaying characteristic, forming an equivalent delay means and hence dispensing with the use of the delay circuit 138.

Although in the above described embodiments, secondary voltage from the secondary coil of the ignition coil is employed as the sparking voltage, but alternatively, primary voltage from the primary coil may be employed. Since in such an alternative case, the sparking voltage is reverse in polarity to the secondary voltage, the signs of various values used for the misfire determination may be reversed to carry out a misfire determination in a manner similar to the manners described above. For example, the reference voltage VREF is set to a positive value so that when the differential value of the sparking voltage is higher than the reference voltage, it is determined that a misfire has occurred.

According to the invention described above, the differential value of the sparking voltage is compared with a predetermined value to determine occurrence of a misfire. When the sparking voltage becomes high toward the end of discharge in the event of a misfire so that dielectric breakdown takes place at an early time, the differential value of the sparking voltage become much higher than at normal firing, which enables positive detection of a misfire.

Further, according to the invention, the time period over which the comparison of the differential value of the sparking voltage with the predetermined value is to be made may be suitably set so as to enable to reduce the influence of noise upon the misfire determination, thereby achieving more accurate misfire detection.

Still further, according to the invention, the detected sparking voltage may be delayed by a predetermined period of time, and a misfire determination is made based upon the delayed detected sparking voltage. As a result, the timing and time period for comparing the differential value of the sparking voltage with the predetermined value can be more suitably set, enabling to further reduce the influence of noise upon the misfire determination.

Besides, according to the invention, another misfire determination may be carried out in addition to the misfire determination based upon the differential value of the sparking voltage, it is determined that a misfire has occurred, when the time period over which the detected sparking voltage exceeds a predetermined voltage value exceeds a predetermined time period, or when the detected sparking voltage exceeds a predetermined value after a predetermined period of time has elapsed from the time of generation of the ignition command signal. As a result, even when the sparking voltage does not rise to a very high voltage value in the event of occurrence of a misfire, the misfire can be positively detected, thereby enhancing the reliability of misfire detection.

What is claimed is:

1. In a misfire-detecting system for detecting a misfire occurring in an internal combustion engine having an ignition system including at least one spark plug, engine operating condition-detecting means for detecting values of operating parameters of said engine, signal-generating means for determining ignition timing of said engine, based upon values of operating parameters of said engine detected by said engine operating condition-detecting means and generating an ignition command signal indicative of said determined ignition timing, and sparking voltage-generating means responsive to said ignition command signal for generating sparking voltage for discharging said at least one spark plug, and voltage value-detecting means for detecting a value of said sparking voltage generated by said sparking voltage-generating means after generation of said ignition command signal, the improvement comprising:

differentiating means, connected to said voltage value-detecting means, for differentiating a value of said sparking voltage detected by said voltage value-detecting means;

misfire-determining means, connected to said differentiating means, for comparing a differential value of said sparking voltage obtained by said differentiating means with a predetermined value, and for determining, based upon a result of said comparison, whether a misfire has occurred in said engine; and time period-limiting means, inserted into a path from said voltage value-detecting means to said misfire-determining means and connected to said signal generating means, for setting a comparison period of time upon which said comparison, of said differential value of said sparking voltage with said predetermined value, is to be made, and wherein said misfire-determining means compares said differential value of said sparking voltage with said predetermined value to determine occurrence of a misfire solely during said comparison period of time set by said time period-setting means.

2. A misfire-detecting system as claimed in claim 1, further including delay means, inserted into a path from said voltage value-detecting means to said misfire-determining means, for delaying a value of said sparking voltage detected by said voltage-detecting means, by a predetermined period of time, and wherein said misfire-determining means compares a value of said sparking voltage delayed by said delay means and differentiated by said differentiating means with said predetermined value.

3. A misfire-detecting system as claimed in claim 2, wherein said time period-limiting means sets said comparison period of time at a time which is delayed by a period of time corresponding to said predetermined period of time by which said detected value of said sparking voltage is delayed by said delay means.

4. A misfire-detecting system as claimed in any of claims 1, 2 or 3, further including second misfire-determining means, connected to said voltage value-detecting mean said second misfire-determining means measures a period of time over which a value of said sparking voltage detected by said voltage-detecting means exceeds a predetermined value, and determines that a misfire has occurred, when said measured period of time exceeds a predetermined value.

5. A misfire-detecting system as claimed in any of claims 1, 2 or 3, further including third misfire-determining means, connected to said voltage value-detecting means, for comparing a value of said sparking voltage detected by said voltage value-detecting means with a predetermined value after a predetermined period of time has elapsed after generation of said ignition command signal, and determining, based upon a result of said last-mentioned comparison, whether a misfire has occurred in said engine.

* * * * *